Figures 1, 2:
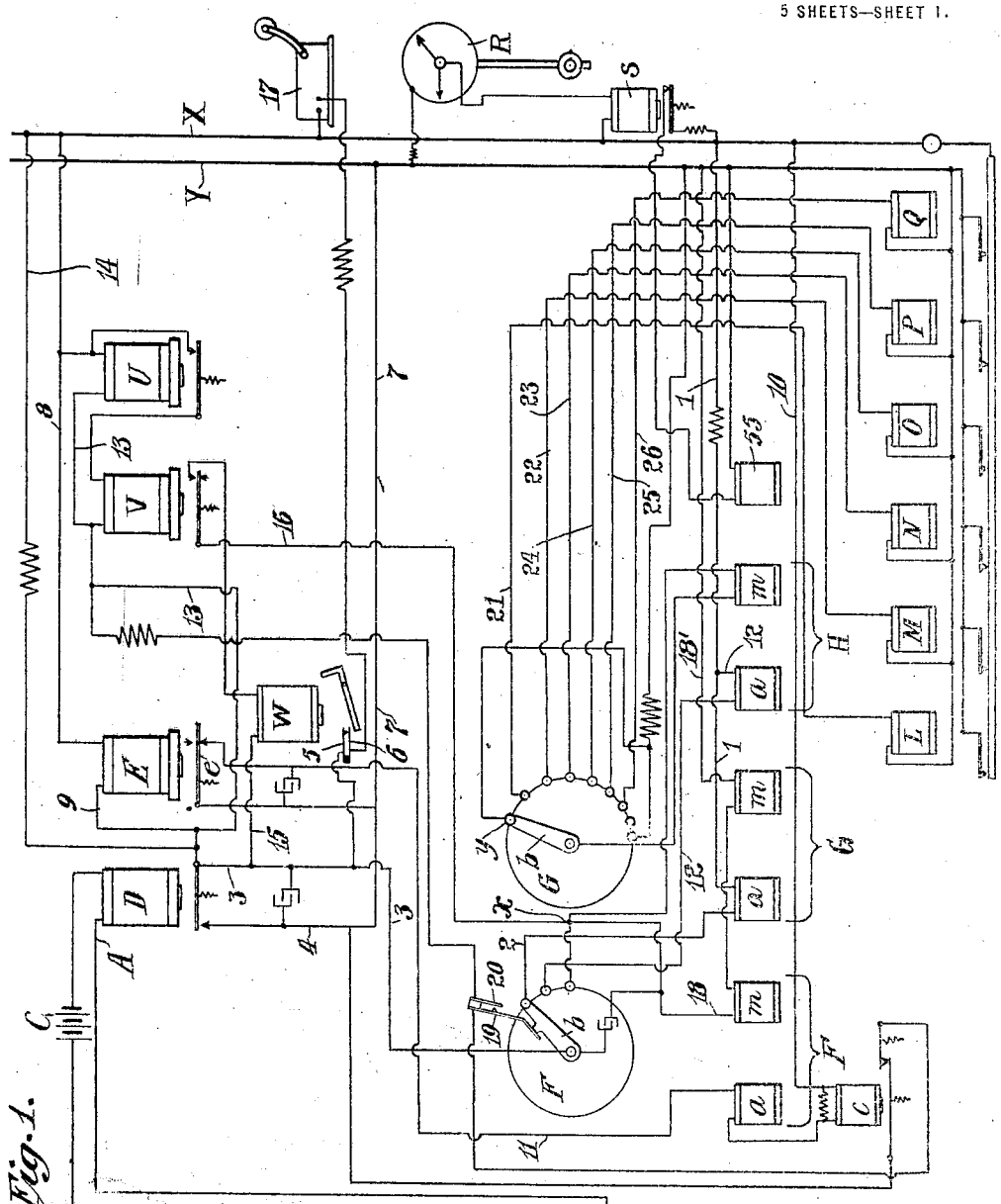

R. M. HOPKINS.
RECORDING SYSTEM AND APPARATUS.
APPLICATION FILED MAY 31, 1917.

1,309,285.

Patented July 8, 1919.
5 SHEETS—SHEET 1.

WITNESSES:

INVENTOR.
Richard M. Hopkins
BY
ATTORNEY.

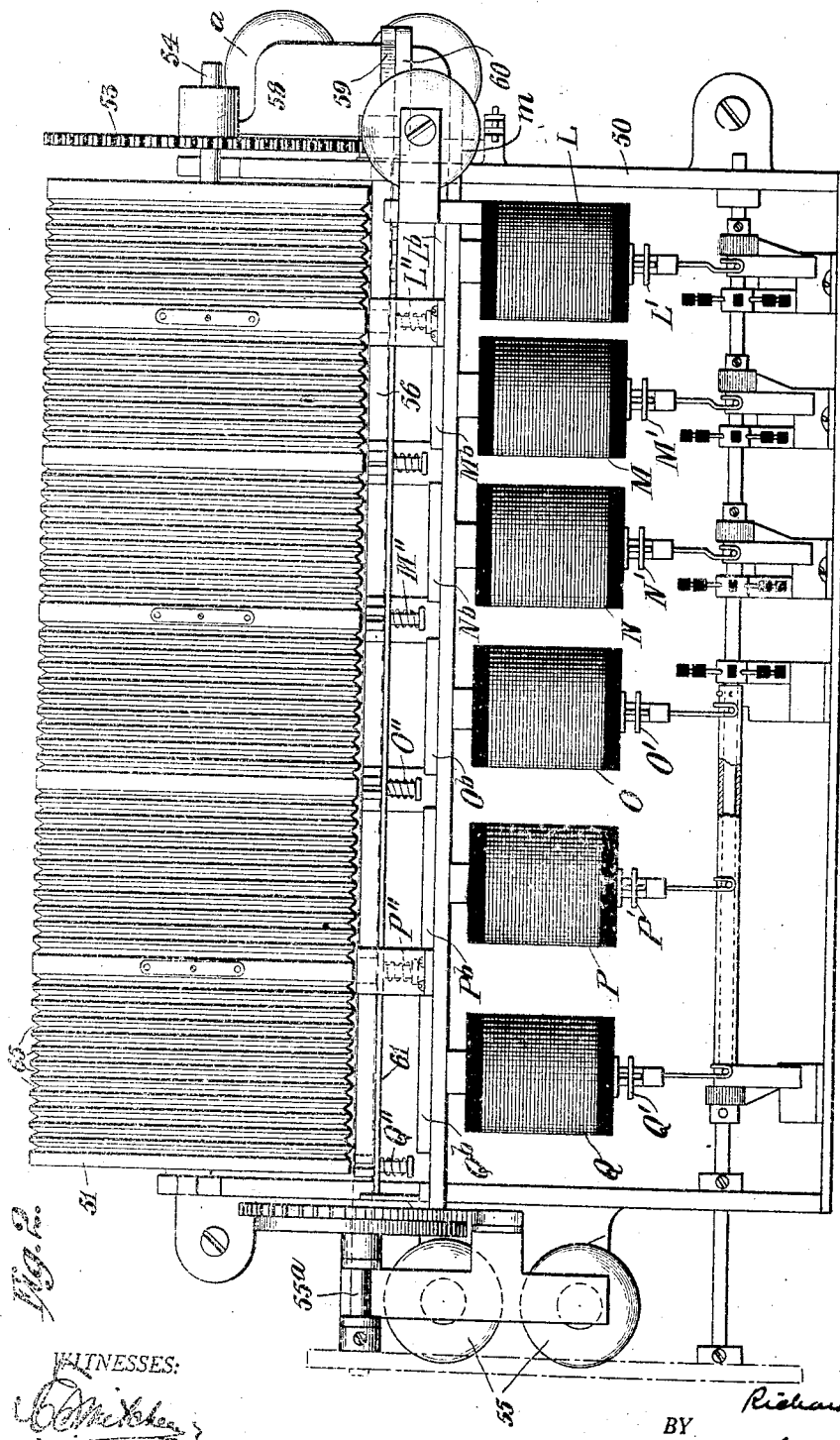

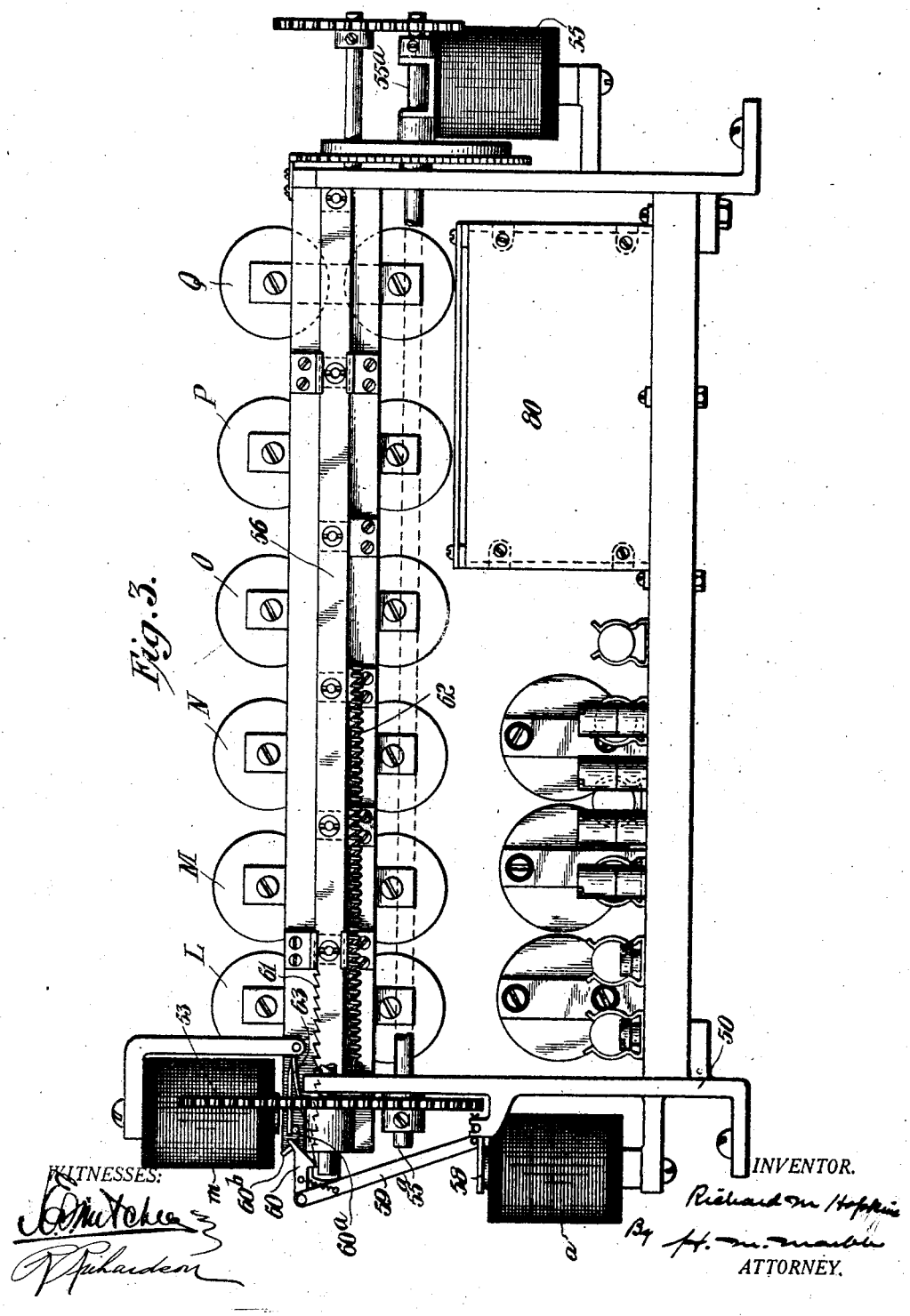

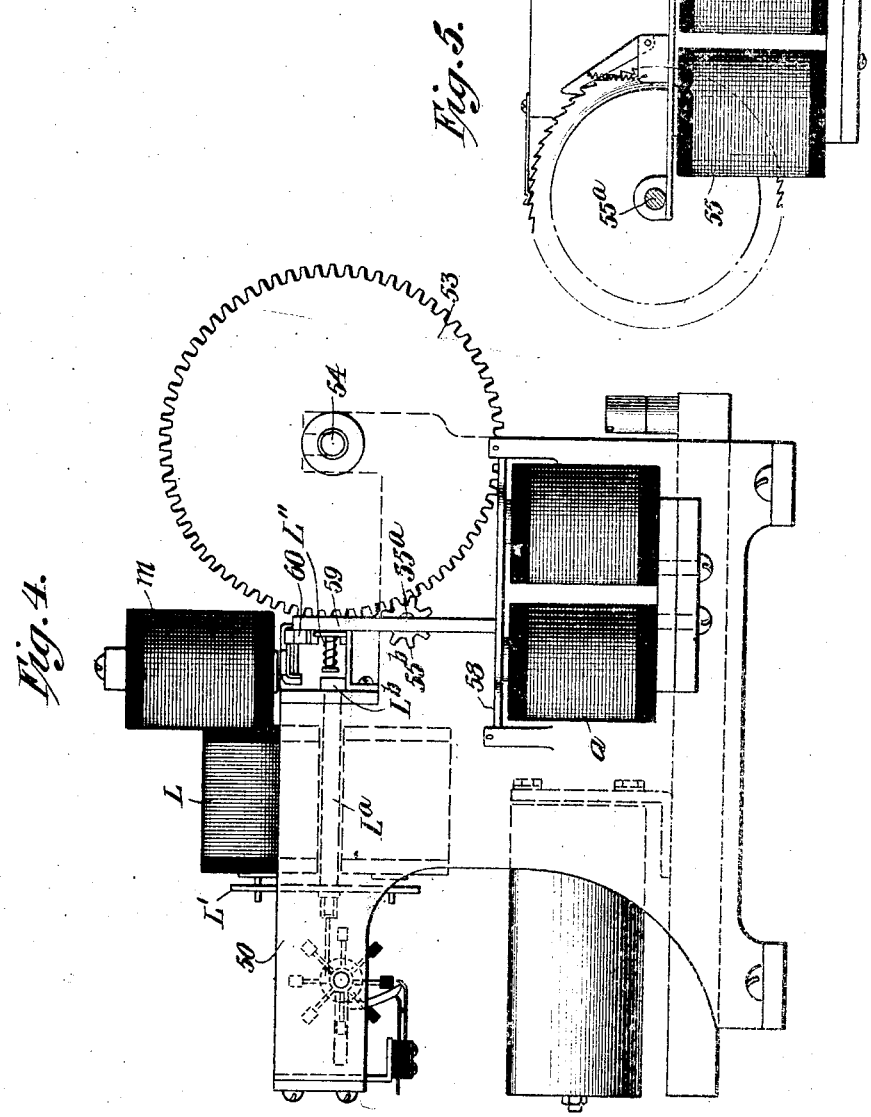

R. M. HOPKINS.
RECORDING SYSTEM AND APPARATUS.
APPLICATION FILED MAY 31, 1917.

1,309,285.

Patented July 8, 1919
5 SHEETS—SHEET 5.

WITNESSES:

INVENTOR.
Richard M. Hopkins
BY
ATTORNEY.

UNITED STATES PATENT OFFICE.

RICHARD M. HOPKINS, OF NEW YORK, N. Y., ASSIGNOR TO AMERICAN DISTRICT TELEGRAPH COMPANY, OF JERSEY CITY, NEW JERSEY, A CORPORATION OF NEW JERSEY.

RECORDING SYSTEM AND APPARATUS.

1,309,285.

Specification of Letters Patent.   Patented July 8, 1919.

Application filed May 31, 1917.   Serial No. 171,940.

*To all whom it may concern:*

Be it known that I, RICHARD M. HOPKINS, a citizen of the United States of America, and a resident of New York, county of New York, and State of New York, have invented a certain new and useful Recording System and Apparatus, of which the following is a specification.

My invention relates to selective systems, particularly systems for recording the signals of watchmen's signal boxes and the like, and constitutes a modification of, and improvement on, the system for the same purpose set forth in my application for Letters Patent, Serial No. 144,952, filed January 27, 1917; though the present invention is not restricted to watchmen's signal recording systems, but is applicable generally to systems employing a plurality of selectors controlled by a master selector. However, it is convenient to describe my invention as applied to the system of said prior application.

Heretofore it has been common to record the signals of a plurality of watchmen's signal boxes on a single circuit, without distinguishing, other than by the box number, between locations from which the signals come. In many cases it happens that the signal boxes of several subscribers or premises or buildings are located in the same circuit, and it is desirable to make the records for the different subscribers, or premises, or buildings, on different portions of a record sheet, or on different record sheets or dials. For example, it is desirable to be able to send, periodically, to each subscriber, the records of signals received from the boxes in his own premises, without, of course, sending to him the records from the boxes in the same circuit which are in the premises of other subscribers. In any case, it is obviously desirable to record the signals from the boxes of any one subscriber or premises, separately from the signals from the boxes of other subscribers or premises. The invention of my said prior application Serial No. 144,952 comprises means whereby this may be done; i. e., a record of the signals from any one group of signal boxes of a circuit may be made which shall be entirely separate from the records of other groups of boxes of the same circuit. The present invention consists in means whereby the recording apparatus is automatically reset in the event of receipt of an imperfect signal (such, for example, as a signal consisting of one digit only), which, except for the present invention, might leave the master selector and one or more of the other selectors in other than the normal position.

The object of my invention is to cause the automatic re-setting of the recording apparatus in the event of receipt of an imperfect signal, and to accomplish this result by simple and reliable means.

Hereinafter, for convenience in description, it will be considered that each group of signal boxes pertains to a separate subscriber, and, correspondingly, that each signal-recording magnet and its corresponding punching or other marking mechanism, hereinafter referred to, pertain to a single subscriber. Obviously, in point of fact, one subscriber might have a plurality of groups of signal boxes; all of the signal boxes of all of the groups herein contemplated might be located on premises of the same subscriber; and the term "subscriber" is, in itself, a mere convenient reference term, without any necessary relation to the facts of any particular installation or installations. However, for convenient classification and recording of signals, it is desirable that the boxes of a circuit be divided into groups, and for the purpose of description it is convenient to consider that each group of boxes pertains to the premises of a single subscriber; and in actual practice this will usually be the case.

I will now proceed to describe my invention with reference to the accompanying drawings, showing apparatus and circuits, constituting one embodiment of my invention, and will then point out the novel features and claims.

In said drawings:

Figure 1 is a diagram illustrating a signal box circuit with a plurality of groups of signal boxes therein, and also illustrating diagrammatically the several selectors, relays, and record-making devices of the system.

Fig. 1ª shows an elevation of a characteristic breakwheel and its co-acting brush or pen, such as may be used in signal boxes, such as are illustrated diagrammatically in Fig. 1.

Figs. 2–9 are drawings illustrating one type of recorder adapted to be used in connection with a system indicated diagrammatically in Fig. 1, and comprising selectors such as are indicated diagrammatically in Fig. 1.

Figure 7:
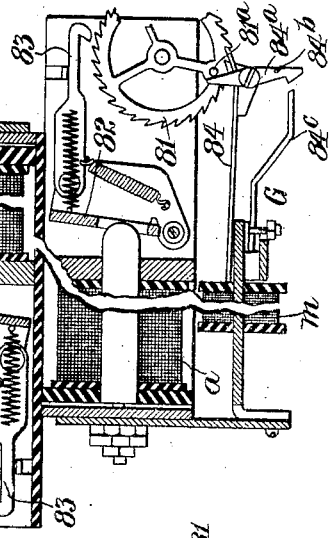
Figure 8:
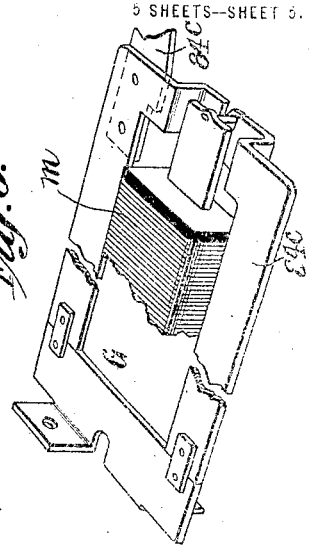
Figure 6:
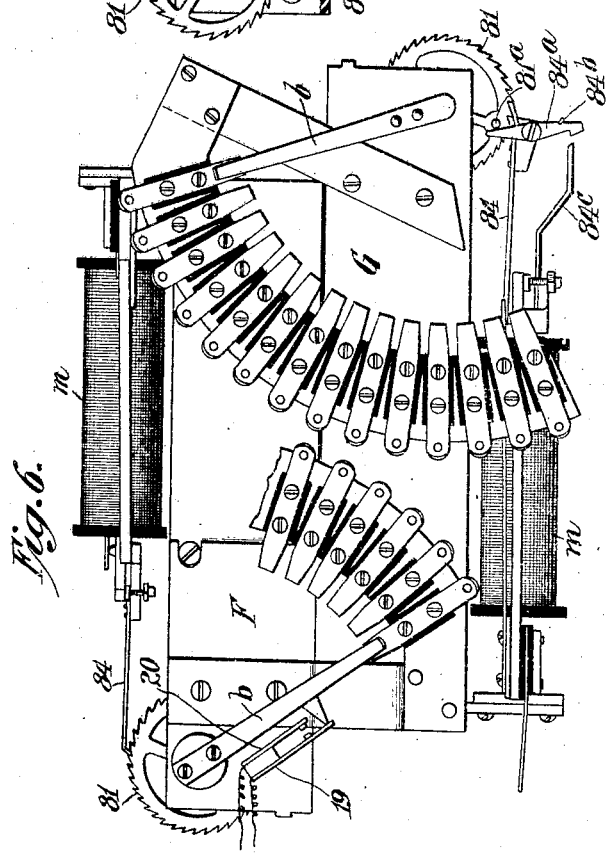
Figure 9:
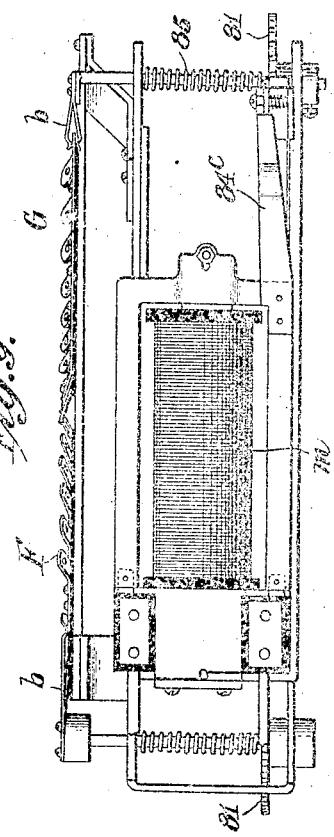

Fig. 2 shows a top view and partial section of the said recorder; Fig. 3 shows a rear vertical elevation of the said recorder, with the record-carrying drum removed. Fig. 4 shows a side elevation of the recorder looking from the right of Fig. 2; Fig. 5 is a detail fragmentary elevation of the ratchet drive mechanism for the drum; Fig. 6 shows a side elevation of the master selector and the primary selector, combined to form one mechanism; Fig. 7 is a central longitudinal section of the mechanism shown in Fig. 6, with the central portion of the mechanism broken away; Fig. 8 is a detail perspective fragmentary elevation of the release magnet pole-piece and armature of the primary selector; Fig. 9 is a top view of the selector mechanism shown in Fig. 6.

Referring first to Fig. 1: A designates a signal box circuit comprising a plurality of groups of signal boxes B, the number of boxes in each group being variable. Each such box may be understood to comprise a signal-transmitting mechanism of the familiar toothed wheel and pen type, as shown, for example, in Fig. 1ᵃ; which mechanism, when operated, will break and complete the circuit A according to some prearranged signal, distinctive of the particular box to which the transmitting mechanism operated belongs. Such signal may be considered to be a box number, each number to consist of two digits; one digit, preferably the initial digit, of the signals of the boxes of any one subscriber, i. e., the initial digit of all of the boxes of any one group, will be the same. In other words, the signals of all of the boxes of one group will begin with the digit "2"; the signals of all of the boxes of another group will begin with the digit "3"; and so on. It should be explained, further, that the term "digit" is employed herein in a special sense. In the ordinary sense the term "digit" includes any of the numerals from one to nine inclusive. The break wheels of the signal boxes comprise teeth, with intervening notches, arranged in two groups separated by spaces; and the number of teeth in any one of these groups may exceed 9; yet it is convenient to speak of the numeral represented by the teeth of any one such group as a digit, and no departure from principle is involved in so doing.

C designates a battery or other source of current supply, in circuit A, and D designates a main line relay, in said circuit A, which repeats the signals of boxes B in the local or central station circuits, as hereinafter described. The elements of the first digit of the box signal are repeated by said relay D into the actuating magnet a of a primary selector G as follows:

From supply conductor X through conductor 1 to the ratchet magnet a of selector G, (hereinafter described), conductor 2, the first contact point and contact arm b of a master selector F, (hereinafter described), and conductor 3 to the armature and rear contact stop of main line relay D, and thence through conductor 4, and common return conductor 7, to the other supply conductor Y. As the armature of main line relay D falls and rises during the operation of any one of the call boxes, this circuit 1—2—3—4—7 will be closed and broken successively, and it will be obvious that the impulses of the first digit of such signal box so operated, as such impulses are transmitted through magnet a of selector G, will cause the contact arm b of that selector to travel successively over the contact points of the selector until, at the end of the first digit of the box number, that contact arm b will have come to rest on a particular contact point of the selector G, thereby forming a circuit through one of the wires 21—26 leading from the contact points of said selector G to one of the punch-operating magnets L—Q (the function of which punch magnets will be explained hereinafter).

E designates a slow acting "governor" relay, the magnet of which is connected by conductor 8 to supply conductor X and is connected by conductor 9 to the armature of line relay D. It will be obvious that each time the armature of relay D is retracted, circuit is completed through the magnet of relay E, and through conductor 7. However, this relay E is so slow in action that while its armature e is moved away from the corresponding rear contact stop during the first closure of the contact of relay D in the transmission of a digit, it does not again contact with its rear stop during the spaces between closures by relay D during the transmission of that digit. The longer spaces, between the digits of the box signals, do, however, cause the armature of relay E to close contact with its rear contact stop, thereby closing a circuit from conductor X through conductor 10, the magnet of a relay c (hereinafter referred to), the ratchet magnet a of master selector F and conductor 11, the rear contact stop of relay E, armature e and thence through conductor 7 to supply conductor Y. Closing this circuit 10—11 causes the contact arm b of selector F to move to the second contact point of selector F, thereby cutting out of circuit the ratchet magnet a of selector G and cutting into circuit 1—12—3—4—7, the ratchet magnet a of a third selector, H. As explained hereinafter, this third selector, H, does not have contact points as do the previous selectors F and G, but instead comprises ratchet mechanism whereby, by the impulses of the second digit of the box signal repeated by relay D through magnet $a$ of this third selector H, the punches of the recording mechanism are spaced along to a position determined by the numerical value of the second digit of the box number.

The armature of relay E is attracted during the transmission of the impulses of the second digit of the box number; but during the space following the second digit, the armature of relay E is again released, thereby operating magnet $a$ of master selector F and moving the contact arm $b$ of that selector to the third contact point of the selector. The instant ratchet magnet $a$ of master selector F has been so energized, and has moved arm $b$ of master selector F into contact with the third contact point of that selector, a circuit is completed from supply conductor X through conductor 8, magnet E, conductors 9 and 3, contact arm $b$ of selector F, the third contact of that selector, dividing point $x$, the release magnet $m$ of selector H, the contact arm $b$ of selector G, the contact point of that selector on which such arm $b$ is then resting, the selected punch magnet of series L—Q (thereby causing action of the corresponding punching mechanism, as hereinafter described) and the return conductor to which those magnets are connected, to supply conductor Y. The armature $e$ of relay E being thereby attracted, the circuit of magnet $a$ of the master selector F is broken; and as the release magnets $m$ of selectors F and G have been energized simultaneously by closure of a circuit from supply conductor X, conductor 8, magnet E, conductors 9 and 3, contact arm $b$ of selector F, the third contact of that selector, point $x$, conductor 18, and conductor 18' to the other supply conductor Y, the arms $b$ of selectors F and G, and the punch-carrying carriage (hereinafter mentioned) of selector H will all return. As hereinafter described, the release of arm $b$ of selector G occurs upon the breaking of the circuit of its magnet $m$ by the return to normal of arm $b$ of selector F, following energization of magnets $m$ of selectors F and G. The arms $b$ of selectors F and G when permitted to return, move to a point somewhat beyond or in rear of the first contact points of those selectors. The magnet $a$ of selector F being in a circuit which is normally closed, and that magnet $a$ being energized immediately upon the return of the arm $b$ to normal, immediately moves such arm $b$ to the first contact point of the selector F and holds it there until, the circuit of magnet $a$ being broken and subsequently completed, the ratchet pawl, hereinafter referred to, operated by such magnet $a$, retreats, engages another tooth of the ratchet operating-mechanism of that arm $b$, and moves such arm $b$ to the second point of the selector.

Magnet $a$ of selector G is in a normally open circuit, and therefore that arm $b$, when returned, remains in rear of the first of its series of contacts connected to magnets L—Q, until, through the receipt of the first digit of the signal of a box, that arm $b$ is advanced to the first of such series of contacts, and possibly to some other contact point of the selector.

Referring now to Figs. 2-9 inclusive, illustrating the multi-record recorder itself, together with the several selectors which, though functionally instruments separate from the recorder, in the construction shown are structurally combined with the recorder proper:

50 designates a suitable frame upon which is mounted revolubly a drum 51 adapted to carry a suitable record sheet. 53 designates a gear wheel, mounted upon the shaft 54 of the drum 51, and 55 (Fig. 5) designates a magnet-operated ratchet mechanism by which gear wheel 53, and so drum 51, is rotated through counter shaft $55^a$ and pinion $55^b$ (Fig. 4). The magnet of this ratchet mechanism is energized at suitable intervals by a time movement, R (Fig. 1), and relay S.

L, M, N, O, P and Q designate punch-operating magnets, each corresponding to one of the groups of signal-boxes B of Fig. 1, and each, therefore, corresponding to a particular subscriber, as explained above. L', M', etc., designate the armatures of these magnets, and L", M", etc., the corresponding punches, operated by these magnets and armatures. The punches are all mounted upon a sliding bar 56, adapted to be moved step-by-step from left to right (as viewed from the front of the machine) by ratchet mechanism comprising a magnet $a$ (Figs. 3 and 4), (which is the same as magnet $a$ of selector H of Fig. 1,) a swinging armature 58 therefor, having a projecting arm 59, and a spring-actuated pawl 60 adapted to engage teeth 61 formed on said bar 56. A pin $60^a$ raises pawl 60 clear of the teeth 61, each time the armature of magnet 57 is retracted; and a pin $60^b$ holds pawl 60 in engagement with a tooth 61, each time the armature of magnet 57 is attracted, and also prevents overthrow. A spring 62 tends to pull said bar to the right, (as seen in Fig. 3), and will restore the bar from any position to which it may have been adjusted by the ratchet mechanism, when permitted to do so. 63 designates a holding pawl for the bar 56, and $m$ a magnet (which is the same as magnet $m$ of selector H of Fig. 1) which, when energized, will lift said pawl 63 thereby permitting spring 62 to restore punch-carrying bar 56. The armatures L', M', etc., having spring-actuated rods $L^a$, $M^a$, etc., carrying hammers L^b, M^b, etc., which are broad, and each will engage and operate its corresponding punch in any position to which that punch may have been adjusted by the action of the ratchet magnet 57 and pawl 60 on bar 56. The drum 51 has grooves 65 opposite the various punching-positions, so that the punch points, after passing through the record sheet, do not touch the surface of the drum and so are not blunted. Various parts of the recorder which are not essential for the understanding of the present invention, I have not described above.

*Selectors.*—The selectors F and G of the recorder are similar in construction, and are grouped in a case 80. Each of these selectors comprises a row of contact points, a contact-arm $b$ adapted to travel over these points successively and to make contact therewith, a ratchet wheel 81 connected to such arm $b$ to move the same, a ratchet magnet $a$, an armature 82 therefor, a spring-returned ratchet-pawl 83 operated by said armature 82, and engaging the teeth of ratchet wheel 81 to rotate said wheel, a holding pawl 84, and a release magnet $m$ which, in the case of selector F, when energized, pulls pawl 84 clear of the ratchet wheel 81, so permitting return movement of that ratchet wheel and contact arm $b$ under the influence of a spring 85. The manner of release of arm $b$ of selector G will be explained hereinafter. When ratchet magnet $a$ of selector G is energized, the first portion of the resulting movement of the ratchet pawl 83 of that selector moves that pawl into engagement with a tooth of the corresponding ratchet wheel 81; further movement of that pawl advancing the ratchet-wheel through the space of one tooth, whereupon the ratchet wheel is held, temporarily, against return, by holding pawl 84. Successive energizations of the ratchet magnet $a$ of either selector advance the ratchet wheel 81 a number of spaces corresponding to the numerical value of the digit of the box signal by which that ratchet magnet is being operated.

The pawl 84 of selector G (the right hand selector shown in Figs. 6 and 7) carries a pawl 84^a which, when the ratchet wheel 81 is in normal position, is held in the position shown by a pin 81^a carried by ratchet wheel 81. When wheel 81 of selector G is advanced by ratchet pawl 82, a spring 84^b forces pawl 84^a into position for engagement with an extension of armature 84^c. When magnet $m$ of selector G is energized, the armature 84^c is pulled up so that the extension of said armature engages with the hook of pawl 84^a. Upon deënergization of such magnet $m$ and consequent retraction of armature 84^c, the extension of such armature, being still in engagement with pawl 84^a, will raise that pawl, and with it, the holding pawl 84, so permitting return of ratchet wheel 81; and at the end of such return pin 81^a disengages 84^a from 84^c.

*Fire signals.*—Fire signals are usually distinguished from watchmen's signals by a dash, or by a Morse character containing a dash, preceding or following the box number; also, by giving the box number of signal a greater number of times than for the watchmen's signal. Signal boxes which distinguish in this manner between fire signals and watchmen's signals are well known and in common use. Such boxes commonly comprise means whereby the distinguishing signal (the dash or the Morse letter containing the dash) is omitted when sending watchmen's signals. The break wheel 90 shown in Fig. 1^a, which wheel is characteristic of break wheels forming a part of the transmitting mechanism of combined watchmen and fire alarm boxes, has teeth for transmitting not only the box number (42, in the particular instance shown) but also the Morse letter F (dot, dash, dot). It is to be understood that, for watchmen's signals, the boxes B are provided with one of the well-known means for eliminating this letter F from the box signal; but that when a fire signal is sent from any of these boxes the said Morse letter F is included as a part of the signal. This special fire signal is made evident at the central station as follows:

U and V, Fig. 1, are slow-acting relays, preferably similar to the relay E already described. These two relays are connected in what may be termed "cascade series"; that is to say, the contacts of relay U control the magnet circuit of relay V. The circuit for the magnet of relay U is from supply conductor X through conductor 8 to magnet of relay U, thence through conductor 13 to the armature of relay D, thence through conductors 4 and 7 to return at Y. This circuit is closed each time the pen 91 (Fig. 1^a) of the box rides upon one of the teeth of the signal wheel 90, and when in consequence, contact is broken between 91 and 92, and the armature of relay D drops. The circuit for relay V is from X and 8 through the contacts of relay U and thence, when these contacts are closed, through the magnet of relay V and to the armature of relay D and thence through the conductors 4 and 7 to return at Y. The retardation obtained by employing two such relays in cascade series, and by the proper adjustment of the relays, is such that the contacts of relay V are not closed while pen 91 is passing over the short teeth of the box number of break wheel 90, but are closed during the passage of pen 91 over the dash of the Morse letter F. The contacts of relay V, so closed, complete a circuit through the magnet of a "drop relay" W, as follows: From supply conductor X, conductor 14, conductor 3, conductor 15, magnet of relay W, contacts of relay V, conductor 16, magnet $m$ of selector F, magnet $m$ of selector G, and back to return at Y. This relay W has a drop armature, which, when attracted toward the magnet of the relay, brings together contacts 5 and 6, and thereby places a register 17 in circuit between the armature of relay D and supply conductor X. The register will then record subsequently received box number signals.

The drop armature of relay W is restored by hand (or otherwise) to open contacts 5 and 6 and throw the register 17 out of action. The mere deënergizaton of the magnet of the relay W does not restore the armature.

The sending of the Morse letter F (dot, dash, dot) does not affect the selectors F and H, because there being in this letter F no space equivalent to a space between digits, governor relay E is not operated. Selector G may be operated, but will be restored automatically. The relay E is operated by the impulses of the letter F, breaking the circuit of magnet $a$ of selector F; and since relays U and V close the circuits of release magnets $m$ of selectors F and G during the dash of the letter F, by a circuit from conductor X through conductor 14, 3 and 15 magnet of relay W, contacts of relay V, conductor 16, magnets $m$ of selectors F and G, and thence to Y, arm $b$ of selector F drops back of the first contact point of selector F, and arm $b$ of selector G also drops back; but when, during the long space following the letter F, the armature of relay E drops, the circuit of magnet $a$ of selector F is completed again, and arm $b$ of that selector is brought back to the first contact point of that selector.

*Restoration of selectors, etc., in the event of receipt of imperfect signals.*—Master selector F is provided with two contact points, 19 and 20, normally separated, that is, separated when arm $b$ of that selector is on the first contact point of the selector, but arranged to make contact with each other when that selector arm $b$ moves from the first to the second contact of the selector. The contact points of the relay $c$, above mentioned, are in series with these contacts 19 and 20. Contact 20 is connected through resistance to the conductor leading from the magnet of relay V to relay D; and the armature of relay $c$ is connected to conductor 4 and so to conductor 7. The magnet of relay $c$ is in the actuating circuit of the ratchet magnet $a$ of master selector F; the magnet of this relay $c$ being shunted by resistance to make the action of that relay slow; and the construction of the relay $c$ may be such, in other respects, as to make this action slow. This magnet of relay $c$ is normally energized.

Now should, for any reason, impulses representing one digit only be received, the contacts of relay $c$ will be open during the receipt of such single series of digits because of the slow acting character of such relay. At the conclusion of the impulse of such single digit, the arm $b$ of master selector F will then move from the first to the second contact point of that selector. Should no further impulse be received, (for example as in the case assumed, should through some derangement or otherwise, impulses of one digit only be received, no second digit following), the magnet of relay $c$ will attract its armature some time after the conclusion of the impulse of such first digit, and will close a circuit from main supply conductor X through conductor 8, the magnet of relay U, contact points 20 and 19, of selector F, the contacts of relay $c$ and conductors 4 and 7 to the other supply conductor Y. By the closure of this circuit just named the relay U is caused to attract its armature, and therefore to energize relay V, closing the contacts of that relay and thereby closing a circuit from conductor X through conductors 14 and 15, the magnet of drop relay W, the contacts of relay V and conductor 16 to point $x$ and thence through the restoring circuits of the various selectors, previously traced; all of the selectors being thereby returned to normal. Upon the return of the armature $b$ of master selector F to normal, contact points 19 and 20 will be separated; the apparatus then being in normal condition. It will further be noted that while the circuit through the magnet $c$ exists, the ratchet magnet $a$ of selector F is energized—a condition necessary for the return of the arm $b$ of that selector, as previously stated.

It will be noted that the recording system to which my invention is applied, as above described, comprises a master selector (F) together with a plurality of secondary selectors (G, H), a space-operated device (governor relay E), whereby the master selector F is caused to switch selector G out of action with line relay D, and to switch selector H into connection with line relay D, upon the occurrence of a space between digits of a box signal; and whereby, on the completion of both digits of the box signal, the selector F is caused to close a restoring (as well as a punching) circuit through its third contact point; whereby all of the selectors are restored to normal; and that the said recording system further comprises means (relays U and V, connected in cascade series to constitute in effect a single slow acting relay) operated by a prolonged impulse or dash to also close restoring circuits; whereby selector F is retained in normal condition, and selector G is returned to normal condition after being actuated by the first dot (if any) of the fire signal. My present invention adds to such former system the contacts 19 and 20 and the restoring relay $c$, whereby, in the event of an incomplete signal which has left the arm b of selector F in some intermediate position, relay c is actuated, as a result of the long space following the incomplete signal, to restore such arm b of selector F to normal condition, and also to restore selector G to normal condition. Relay c uses relays U and V (already having a restoring function, as previously described) as a particularly convenient means for the closing of the necessary restoring circuits; obviously, it would be an easy matter to provide special restoring means, operated by relay c, for closing the necessary restoring circuits; and from what has been said above, this obviously could be done by persons skilled in the art, but it is considered better to cause the relay c to utilize the already existing restoring means, U and V, for the completion of the necessary restoring circuits.

In its fundamental aspect, the present invention is independent of the number of selectors (G, H, etc.) controlled by master selector F, and it is possible that if the present invention be applied to selective systems other than the particular selective system of my prior application, Serial 144,952, selector F might control more than two secondary selectors; but however many secondary selectors the master selector F may control, the restoring relay c will cause the restoration of the master selector F, and of any of the other selectors which may have been operated, to normal, when such master selector and secondary selector or selectors have been operated by an incomplete signal.

In another application, Serial 144,951, filed Jan. 27, 1917, I have illustrated a recording system comprising more than two secondary selectors controlled by a primary selector, and have illustrated a so-called "mechanical governor" constituting, in a broad sense, an equivalent of the governor relay or space controlled relay E of my present application and by my said prior application, Serial 144,952. It will be obvious that this restoring relay c may be applied to the system of my said prior application, Serial 144,951; also that the mechanical governor of said application, Serial 144,951, might be substituted for the governor relay E in the present application and of application, Serial 144,952. Contacts 19 and 20 prevent any restoration action of relay c except when the arm b of primary selector F has moved from its first position. Any restoration action of relay c after the completion of a complete signal is immaterial, since the restoring circuits are completed immediately arm b reaches the third contact of selector F, at the end of a complete signal; and, moreover, in general arm b will have been restored to normal position, and will have separated contacts 19 and 20, before relay c (which is, as above explained, a very slow acting relay) can have operated following a complete signal. In the event of a fire signal, relays U and V will have effected restoration, under the influence of the dash of the fire signal, before relay c can have acted.

What I claim is:

1. In a selective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, and restoring means arranged to restore said selectors and master selector to normal in the event that the master selector is left, for a prolonged period, in an intermediate condition, as may happen when an incomplete signal is received.

2. In a selective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, and restoring means comprising a slow acting relay arranged to cause restoration of said selectors and master selectors to normal, in the event that the master selector is left, for a prolonged period, in an intermediate condition, as may happen when an incomplete signal is received.

3. In a selective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, and restoring means comprising a slow acting relay arranged to cause restoration of said selectors and master selector to normal, in the event that the master selector is left, for a prolonged period, in an intermediate condition, as may happen when an incomplete signal is received; said master selector having a contact, broken when said master selector is in normal condition, and closed when said master selector is operated by a signal, which contact, when open, interrupts the actuating circuit of said slow acting relay.

4. In a selective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, a governor, controlling the actuating circuit of said master selector and operated by spaces between impulse groups, but not by shorter spaces between impulses, restoring means set in operation by said master selector and the governor during the space following a complete signal, and other restoring means arranged to restore said selectors and master selector to normal, in the event that the master selector is left, for a prolonged period, in an intermediate condition.

5. In a selective system, the combination with a plurality of secondary selectors, and signaling means adapted for actuating said selectors and adapted to be connected to said secondary selectors successively, of a master selector arranged to switch said secondary selectors into connection with said signaling means successively, and restoring means arranged to restore said secondary selectors and master selector to normal, in the event that the master selector is left, for a prolonged period, in an intermediate condition.

6. In a selective system, the combination with a plurality of secondary selectors, and signaling means adapted for actuating said selectors and adapted to be connected to said secondary selectors successively, of a master selector arranged to switch said secondary selectors into connection with said signaling means successively, and restoring means comprising a slow acting relay arranged to cause restoration of said secondary selectors and master selector to normal, in the event that the master selector is left, for a prolonged period, in an intermediate condition.

7. In a selective system, the combination with a plurality of secondary selectors, and signaling means adapted for actuating said selectors and adapted to be connected to said secondary selectors successively, of a master selector arranged to switch said secondary selectors into connection with said signaling means successively, and restoring means comprising a slow acting relay arranged to cause restoration of said secondary selectors and master selector to normal, in the event that the master selector is left, for a prolonged period, in an intermediate condition, said master selector having a contact, broken when said master selector is in normal condition, and closed when said master selector is in other than normal condition, which contact, when open, interrupts the actuating circuit of said slow acting relay.

8. In a selective system, the combination with a plurality of secondary selectors and signaling means adapted to actuate said secondary selectors by signals comprising a plurality of groups of impulses, of a master selector arranged to switch said secondary selectors successively into operative connection with said signaling means, a governor, controlling the actuating circuit of said master selector, and operated by spaces between impulse groups, but not by shorter spaces between impulses, restoring means set in operation by said master selector and the governor during the space following a complete signal, and other restoring means arranged to restore said selectors and master selector to normal, in the event that the master selector is left, for a prolonged period, in an intermediate condition.

9. In a selective system, the combination with a plurality of secondary selectors, and signaling means adapted to actuate said secondary selectors by signals comprising a plurality of groups of impulses, and by signals comprising impulses of differing lengths, of a master selector arranged to switch said secondary selectors successively into operative connection with such signaling means, a governor, controlling the actuating circuit of said master selector, and operated by spaces between impulse groups, but not by shorter spaces between impulses, restoring means set in operation by said master selector and the governor during the space following a complete signal, other restoring means set in operation by one of the longer impulses, and still other restoring means arranged to restore said selectors and master selector to normal, in the event that the master selector is left, for a prolonged period, in an intermediate condition.

10. In a selective system, the combination with a line relay and signaling means adapted for actuating said relay by signals comprising a plurality of groups of impulses, and by impulses of differing lengths, of a plurality of secondary selectors arranged to be connected successively to said line relay for actuation thereby, a master selector arranged to switch said secondary selectors in connection with said line relay successively, a governor, controlling the actuating circuit of said master selector and operated by spaces between impulse groups, but not by shorter spaces between impulses, restoring means set in operation by said master selector and the governor during the space following a complete signal, other restoring means arranged to restore such secondary selectors and master selector to normal, in the event of the transmission of one of the longer impulses, and further restoring means arranged to restore said selectors and master selector to normal, in the event that the master selector is left, for a prolonged period, in an intermediate condition.

11. In a selective system, the combination with a line relay and signaling means adapted for actuating said relay by signals comprising a plurality of groups of impulses, and by impulses of differing lengths, of a plurality of secondary selectors arranged to be connected successively to said line relay for actuation thereby, a master selector arranged to switch said secondary selectors in connection with said line relay successively, a governor, controlling the actuating circuit of said master selector and operated by spaces between impulse groups, but not by shorter spaces between impulses, restoring means set in operation by said master selector and the governor during the space following a complete signal, other restoring means arranged to restore such secondary selectors and master selector to normal, in the event of the transmission of one of the longer impulses, and further restoring means arranged to operate, in the event that the master selector is left, for a prolonged period, in an intermediate condition, and arranged, when it operates, to set in operation the above mentioned restoring means operated by one of the longer impulses.

12. In a selective system, the combination with a plurality of secondary selectors, and signaling means adapted to actuate said secondary selectors, and comprising transmitters arranged to transmit signals comprising a plurality of groups of impulses, and also to transmit a special signal separated from such groups of impulses, of a master selector arranged to switch such secondary selectors successively into operative connection with such signaling means, a governor, controlling the actuating circuit of said master selector, and operated by spaces between impulse groups, but not by shorter spaces between impulses, restoring means set in operation by the master selector and the governor during the space following a complete signal, other restoring means set in operation by the special signal referred to, and still other restoring means arranged to restore said selectors and master selector to normal, in the event that the master selector is left, for a period longer than the space between the regular signal and special signal of said transmitters, in an intermediate condition.

13. In a selective system, the combination with a plurality of secondary selectors, and signaling means adapted to actuate said secondary selectors, and comprising transmitters arranged to transmit signals comprising a plurality of groups of impulses, and also to transmit a special signal separated from such groups of impulses by a space longer than the space between the groups of impulses, of a master selector arranged to switch such secondary selectors successively into operative connection with such signaling means, a governor controlling the actuating circuit of said master selector, and operated by spaces between impulse groups, but not by shorter spaces between impulses, restoring means set in operation by the master selector and the governor during the space following a complete signal, other restoring means set in operation by the special signal referred to, and a slow acting restoring relay connected in circuit with the governor, and arranged to operate restoring means of the system, in the event that the master selector is left, for a period longer than the space between the regular signal and special signal of said transmitters, in an intermediate condition.

14. In a selective system, the combination with a plurality of secondary selectors, and signaling means adapted to actuate said secondary selectors, and comprising transmitters arranged to transmit signals comprising a plurality of groups of impulses, and also to transmit a special signal separated from such groups of impulses by a space longer than the space between the groups of impulses, of a master selector arranged to switch such secondary selectors successively into operative connection with such signaling means, a governor, controlling the actuating circuit of said master selector, and operated by spaces between impulse groups, but not by shorter spaces between impulses, restoring means set in operation by the master selector and the governor during the space following a complete signal, other restoring means set in operation by the special signal referred to, and a slow acting restoring relay connected in circuit with the governor and arranged to cause the operation of the restoring means normally operated only by the special signal referred to, in the event that the master selector is left, for a period longer than the space between the regular signal and the special signal of said transmitters, in an intermediate condition.

15. In a selective system, the combination with a plurality of secondary selectors, and signaling means adapted to actuate said secondary selectors, and comprising transmitters arranged to transmit signals comprising a plurality of groups of impulses, and also to transmit a special signal separated from such groups of impulses by a space longer than the space between the groups of impulses, of a master selector arranged to switch such secondary selectors successively into operative connection with such signaling means, a governor, controlling the actuating circuit of said master selector, and operated by spaces between impulse groups, but not by shorter spaces between impulses, restoring means set in operation by the master selector and the governor during the space following a complete signal, other restoring means set in operation by the special signal referred to, and a slow acting restoring relay connected in circuit with the governor and arranged to cause the operation of the restoring means normally operated only by the special signal referred to, in the event that the master selector is left, for a period longer than the space between the regular signal and the special signal of said transmitters, in an intermediate condition, said master selector having a contact in the circuit whereby said slow acting relay controls restoring means as aforesaid, which contact is open when the said master selector is in normal condition, and is closed when said master selector is in a condition corresponding to partial operation.

16. In a selective system, the combination with a line relay and signaling means adapted for actuating said relay, and comprising transmitters arranged to transmit signals comprising a plurality of groups of impulses separated by a space, and also to transmit a separate signal separated from the preceding regular signal by a longer space, of a plurality of secondary selectors arranged to be connected successively to said signaling means for actuation thereby, a master selector arranged to switch said secondary selectors in connection with said line relay successively, and comprising an actuating magnet, a governor, controlling the actuating circuit of such master selector magnet, and operated by spaces between impulse groups, but not by shorter spaces between impulses, restoring means set in operation by said master selector and governor during the space following a complete regular signal, a slow acting restoring relay having its magnet in circuit with the said magnet of the master selector, said restoring relay arranged to operate in the event that the master selector is left in an intermediate condition for a period longer than the space between the regular signal and the special signal of said transmitters, and restoring means operated by said slow acting restoring relay when so operated.

In testimony whereof I have signed this specification in the presence of two subscribing witnesses.

RICHARD M HOPKINS.

Witnesses:
 GEO. BOSCH,
 NELLIE HAIG.